United States Patent [19]

Suzuki et al.

[11] Patent Number: 4,999,011
[45] Date of Patent: Mar. 12, 1991

[54] DISPLAY APPARATUS FOR A VEHICLE

[75] Inventors: Yoshiyuki Suzuki; Kunimitsu Aoki; Tadashi Iino, all of Susono, Japan

[73] Assignee: Yazaki Corporation, Japan

[21] Appl. No.: 305,018

[22] Filed: Feb. 2, 1989

Related U.S. Application Data

[62] Division of Ser. No. 182,292, Apr. 15, 1988.

[30] Foreign Application Priority Data

Apr. 16, 1987 [JP] Japan .................................. 62-56667
Apr. 16, 1987 [JP] Japan .................................. 62-56668
May 30, 1987 [JP] Japan .................................. 62-82134

[51] Int. Cl.$^5$ ............................................. G03B 21/00
[52] U.S. Cl. .................................................... 353/14
[58] Field of Search ................................. 353/10-14, 353/7-9, 30-35; 340/705; 350/144, 174

[56] References Cited

U.S. PATENT DOCUMENTS

| | | |
|---|---|---|
| 2,019,234 | 10/1935 | Nistri ..................................... 353/14 |
| 2,537,996 | 1/1951 | Hankes ................................... 353/14 |
| 3,711,826 | 1/1973 | Russa ..................................... 353/28 X |
| 4,711,544 | 12/1987 | Iino et al. ............................ 353/98 X |
| 4,714,320 | 12/1987 | Banbury . |
| 4,736,214 | 4/1988 | Rogers ..................................... 353/10 |
| 4,746,206 | 5/1988 | Kusztos et al. . |
| 4,787,711 | 11/1988 | Suzuki . |
| 4,804,836 | 2/1989 | Iino . |
| 4,806,904 | 2/1989 | Watanuki . |
| 4,831,366 | 5/1989 | Iino . |
| 4,837,551 | 6/1989 | Iino . |

FOREIGN PATENT DOCUMENTS

| | | |
|---|---|---|
| 899009 | 12/1953 | Fed. Rep. of Germany ........ 353/14 |
| 2154020 | 8/1985 | United Kingdom . |
| 2154757 | 9/1985 | United Kingdom . |
| 2182456 | 5/1987 | United Kingdom . |

Primary Examiner—Harry N. Haroian
Attorney, Agent, or Firm—Wigman & Cohen

[57] ABSTRACT

A display apparatus for a vehicle comprises a unit for projecting display pattern provided by a display unit onto a projecting face in front of a driver's seat, the projecting unit having first and second display devices respectively forming virtual images in positions different from each other in front of the projecting race; and a unit for visually overlapping an outer landscape in front of a front glass and the virtual images of the display patterns provided by the projecting unit. The display apparatus further comprises a half mirror for making a display pattern of the first display device penetrate therethrough, and reflecting a display pattern of the second display device.

A virtual image display apparatus comprises a display device for providing plural display patterns by making light penetrate therethrough; a lens for enlarging images of the display patterns and forming virtual images thereof and projecting the virtual images onto a reflecting member, the display device being arranged within the focal distance of the lens; and a device for providing a stereo-image based on the virtual images by the display device and the lens.

7 Claims, 8 Drawing Sheets

DISPLAY APPARATUS FOR A VEHICLE

This is a divisional of co-pending application Ser. No. 07/182,292 filed on Apr. 15, 1988.

The present invention relates to a display apparatus for a vehicle, and in particular, to a so-called head-up display apparatus in which a display pattern provided by a display device is projected on a projecting face in front of a driver's seat, and a virtual image of the display pattern visually overlaps an outer landscape in front of a front glass.

BACKGROUND OF THE INVENTION

Figure 1:
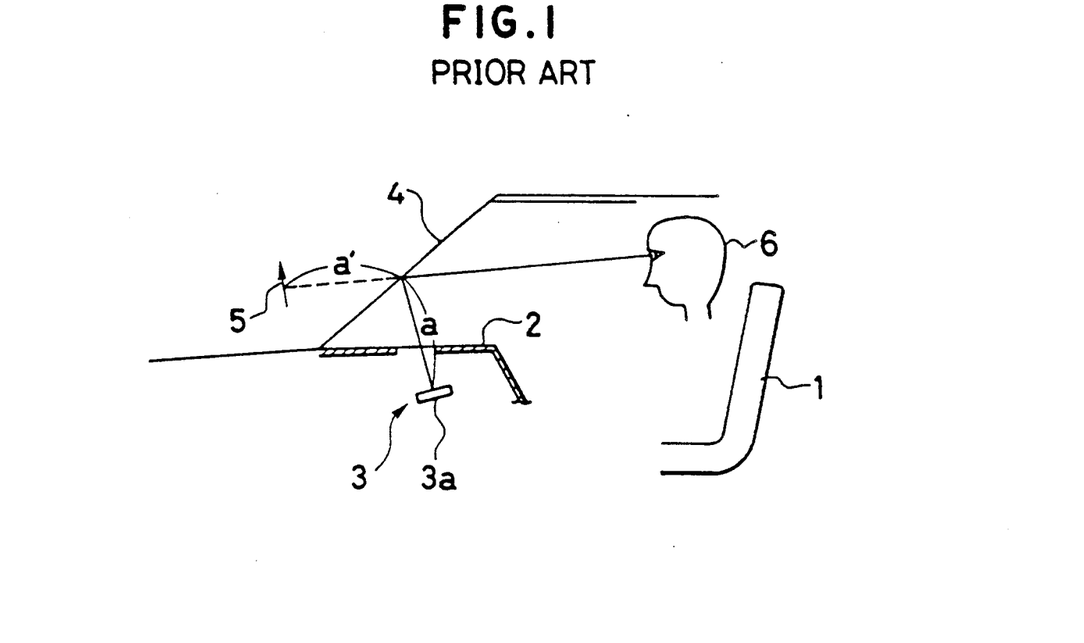
FIGS. 1 and 2 are schematic views showing conventional display apparatuses for a vehicle.
Figure 2:
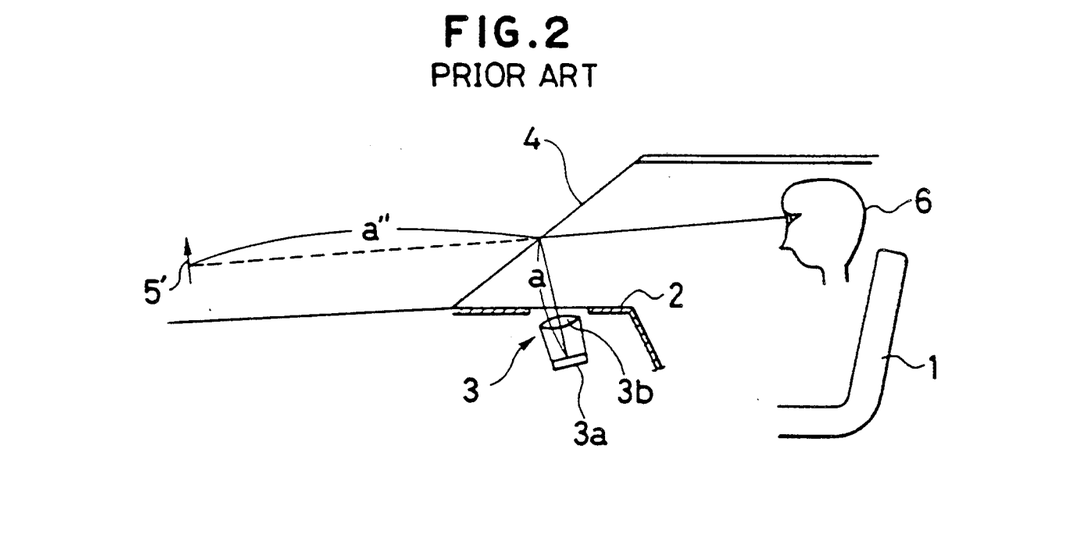

In a conventional head-up display apparatus of this kind shown in FIGS. 1 and 2, a projector 3 is disposed within a dash board 2 in front of a driver's seat in a vehicle.

The apparatus shown in FIG. 1 is called a simple reflection system, and the projector 3 is composed of only a display device 3a. An image of a display pattern on the display device 3a from the projector 3 is reflected by a front glass 4 acting as a combiner, and is then visualized by a driver 6 as a virtual image 5 in front of the front glass 4. With respect to the position of the virtual image 5, the distance a between the display device 3a and the front glass 4 as a combiner is equal to the distance a' between the front glass 4 and the virtual image 5.

The apparatus shown in FIG. 2 is called a distant display system, and the projector 3 is composed of a display device 3a and a lens 3b. An image of a display pattern on the display device 3a projected on the front glass 4 through the lens 3b is reflected by the front glass 4, and is visualized as a virtual image 5' in a predetermined position in front of the front glass 4. With respect to the position of the virtual image 5', the distance a between the display device 3a and the front glass 4 is less than the distance a'' between the front glass 4 and the virtual image 5'.

In the conventional head-up display apparatuses mentioned above, the virtual images 5 and 5' are only formed in predetermined positions in front of the front glass 4. Therefore, the displayed image has no deep feeling so that, even when the image is distantly displayed, it is difficult to visually judge how far the displayed image is located since there is no compared object in the displayed image.

The head-up display apparatus for a vehicle was developed to avoid the danger of temporarily looking at a meter, etc., within the vehicle from the external field of view. The driver can visually overlap the external field of view and image data such as fuel, speed reflected by a front shield glass as a screen.

In the head-up display apparatus, a display device composed of a liquid crystal cell is used, and light is illuminated onto a display pattern formed in the display device, and is guided to the front shield glass through an optical system, and a virtual image is formed there.

Figure 3:
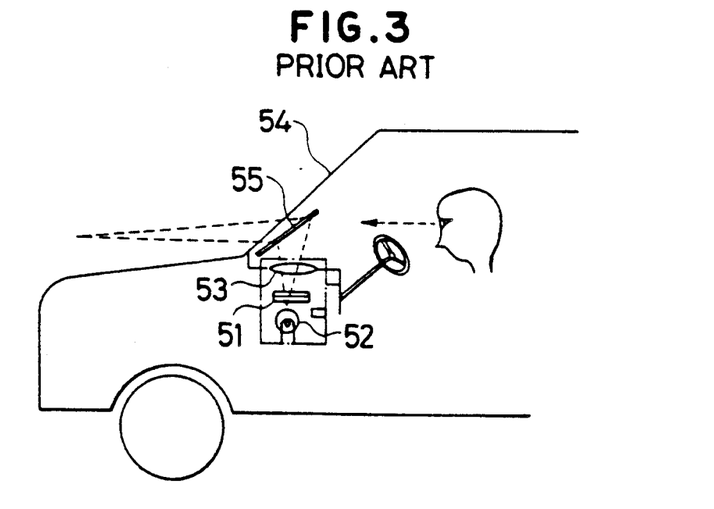
FIG. 3 is a schematic view showing the basic construction of another conventional head-up display apparatus.

FIG. 3 shows the basic construction of a display apparatus of this type. In FIG. 3, a liquid crystal cell 51 constitutes a display device, and a light source 52 illuminates the liquid crystal cell 51 from the back side thereof, and a lens 53 enlarges an image of the liquid crystal cell 51.

Namely, the liquid crystal cell 51 is disposed within the focal distance of the lens 53, and a display pattern formed within the liquid crystal cell 51 is illuminated by the light source 52, and a virtual image thereof is formed, through the lens 53, by a half mirror 55 disposed in front of a front shield glass 54, or by the front shield glass 54 as a half mirror.

Accordingly, the driver can visually overlap the virtual image and the external field of view as mentioned before.

When such a conventional display apparatus of this kind is used as a meter, it is necessary to display a strengthened image for the driver. The conventional meter of an instrument fitting type has various functions and designs for easily looking at the image.

When the virtual image display apparatus is constructed by the above viewpoint, the apparatus has the advantages in that the virtual image does not prevent the front field of view, but the display pattern formed within the liquid crystal cell is displayed on a plane in front of the driver, so that the display image does not have any sufficient three dimensional structure such as thickness, weight to be appealed as an image in comparison with the conventional apparatus, thereby giving no sufficiently impacted image to the driver.

Further, the size of the liquid crystal cell is limited to a considerably small one by the optical principle thereof, and the number of dots constituting picture elements is limited within the range of the limited size of the liquid crystal cell. Therefore, it is difficult to form a plurality of display patterns, and the displayed content and the pattern are rough in accordance with the size of the liquid crystal cell, thereby providing no sufficiently three-dimensional image.

SUMMARY OF THE INVENTION

With the problems mentioned above, an object of the present invention is to provide a display apparatus for a vehicle for providing a deep feeling for a displayed image.

Another object of the present invention is to provide a virtual image display apparatus for providing a three-dimensionally displayed image.

With the above objects in view, the present invention resides in a display apparatus for a vehicle comprises means for projecting display patterns provided by a display means onto a projecting face in front of a driver's seat, said projecting means having first and second display devices respectively forming virtual images in positions different from each other in front of the projecting face; and means for visually overlapping an outer landscape in front of a front glass and the virtual images of the display patterns provided by the projecting means. The display apparatus further comprises mirror means for making a display pattern of the first display device penetrate therethrough, and reflecting a display pattern of the second display device.

The present invention also resides in a virtual image display apparatus comprising display means for providing plural display patterns by making light penetrate therethrough; lens means for enlarging images of the display patterns and forming virtual images thereof and projecting the virtual images onto a reflecting member, said display means being arranged within the focal distance of the lens means; and means for providing a stereo-image based on the virtual images by the display means and the lens means.

BRIEF DESCRIPTION OF THE DRAWINGS

The present invention will be more apparent from the following description of the preferred embodiments thereof in conjunction with the accompanying drawings in which.

DETAILED DESCRIPTION OF THE PREFERRED EMBODIMENTS

The preferred embodiments of the present invention will now be described in detail with reference to the accompanying drawings.

Figure 4:
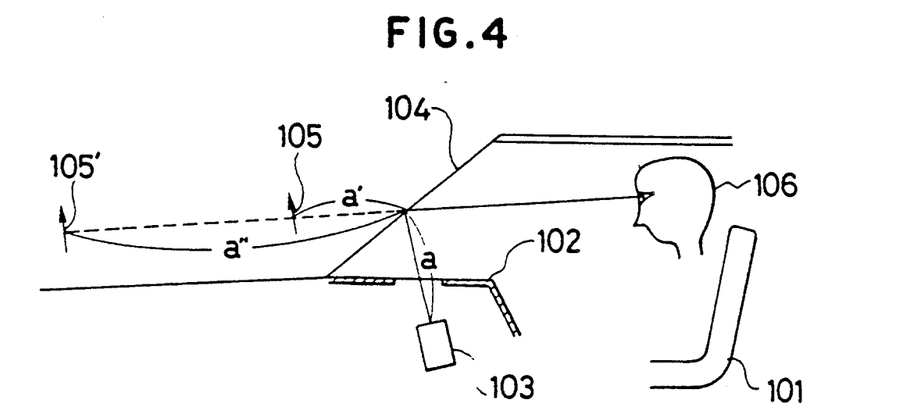
FIG. 4 is a schematic view showing a display apparatus for a vehicle in accordance with one embodiment of the present invention.
Figure 5:
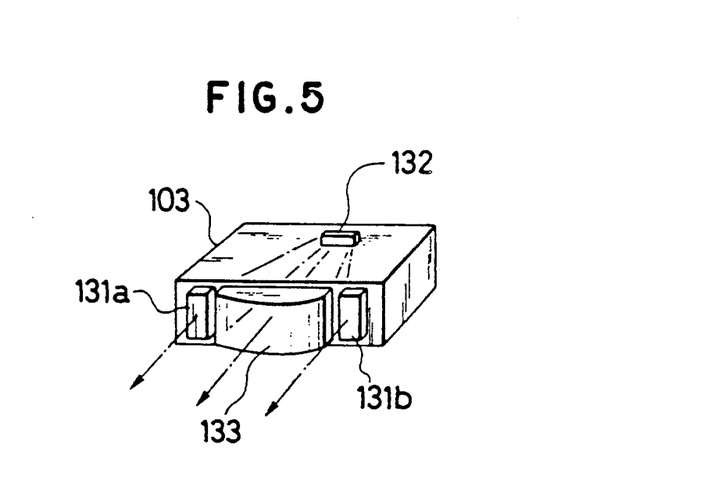
FIG. 5 is a perspective view showing a projector of the display apparatus of FIG. 4.

In FIGS. 4 and 5, a projector 103 is disposed within a dash board 102, and is composed of display devices 131a and 131b for simple reflection, a display device 132 for displaying a distant landscape, and a lens 133 disposed corresponding to the display device 132. In FIG. 5, the display devices 131a and 131b are disposed on the same face as the lens 133, and the display device 132 is disposed backwards from the lens 133.

As shown in FIG. 4, the projector 103 disposed within the dash board 102 directly projects display patterns on the display devices 131a and 131b onto a front glass 104, and projects a display pattern on the display device 132 onto the front glass 104 through the lens 133. The display patterns on the display devices 131a and 131b projected on the front glass 104 is reflected by the front glass 104, and a virtual image 105 is formed in a position in front of the front glass 104 in which the distance a' between the virtual image 105 and the front glass 104 is equal to the distance a from the display devices 131a and 131b to the front glass 104. On the other hand, a display pattern on the display device 132 projected onto the front glass 104 through the lens 133 is reflected by the front glass 104, and a virtual image 105' is formed in a position in front of the virtual image 105 in which the distance between the virtual image 105' and the front glass 104 is designated by a".

As mentioned above, virtual images 105 and 105' are formed in positions in which the distances a' and a" from the front glass 104 to the virtual images are different from each other, so that a driver 106 sitting on a driver's seat 101 can visually look at a displayed image having a deep feeling in front of the front glass 104.

Figure 6:
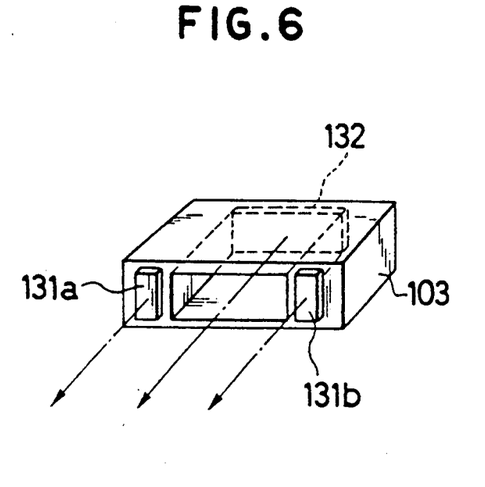
FIG. 6 is a perspective view showing another embodiment of the projector of the display apparatus.
Figure 7:
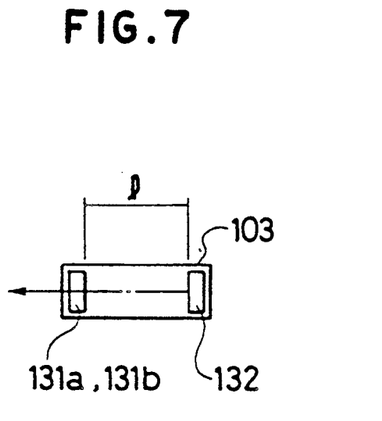
FIG. 7 is a side view of the projector of FIG. 5.

FIGS. 6 and 7 show another embodiment of the projector. In this embodiment, different from the former embodiment, the lens 133 is removed from the projector 103, and a display device 132 for displaying a distant landscape is disposed backwards by a distance from display devices 131a and 131b for simple reflection.

Figure 8:
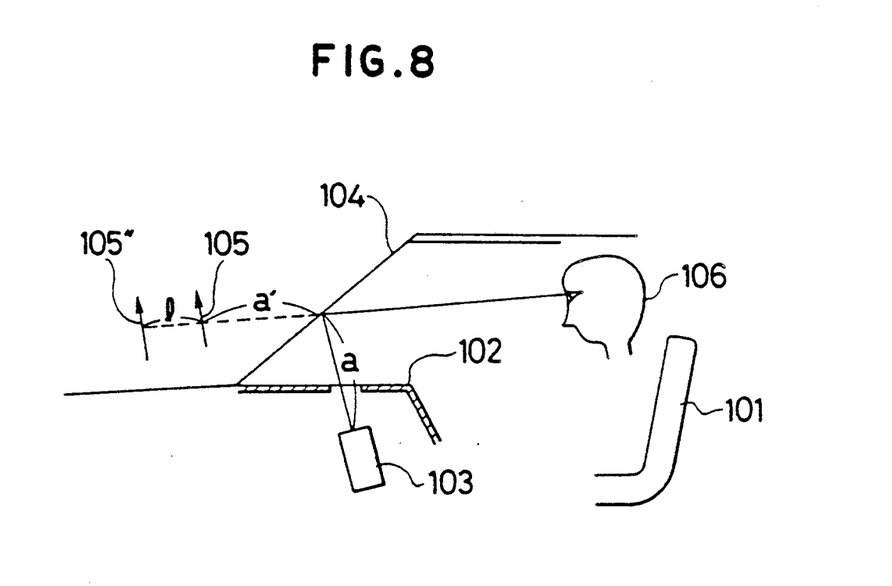
FIG. 8 is a schematic view showing the display apparatus provided with the projector of FIGS. 6 and 7.

In the apparatus constructed above, display patterns on the display devices 131a, 131b and 132 are projected onto the front glass 104 from the projector 103, and are then reflected by the front glass 104. Accordingly, a virtual image 105" of the display pattern of the display device 132 disposed backwards by distance is formed forwards by distance from a virtual image 105 of the display devices 131a and 131b. Accordingly, the apparatus provides, within one display, two kinds of display images having displayed positions different from each other by distance so that the driver 106 can visually look at the display having a deep feeling.

In the above embodiments, the front glass 104 is used as a combiner, but a combiner composed of a half mirror, etc., may be independently disposed in front of the front glass 104.

As mentioned above, in accordance with the present invention, two kinds of images having different display positions are formed in front of a front glass so that the displayed image has a deep feeling, and the visuality of the displayed image is improved, and the variation of the display is increased.

FIGS. 9 to 14 show another embodiment of a display apparatus for a vehicle in accordance with the present invention.

Figure 9:
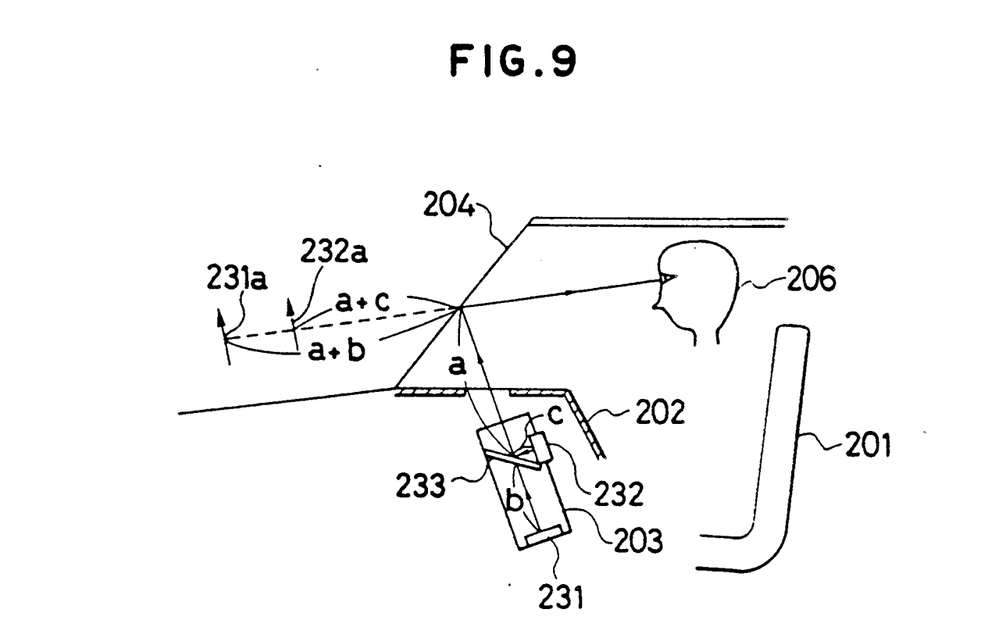
FIG. 9 is a schematic view showing a display apparatus in accordance with another embodiment of the present invention.
Figure 10:
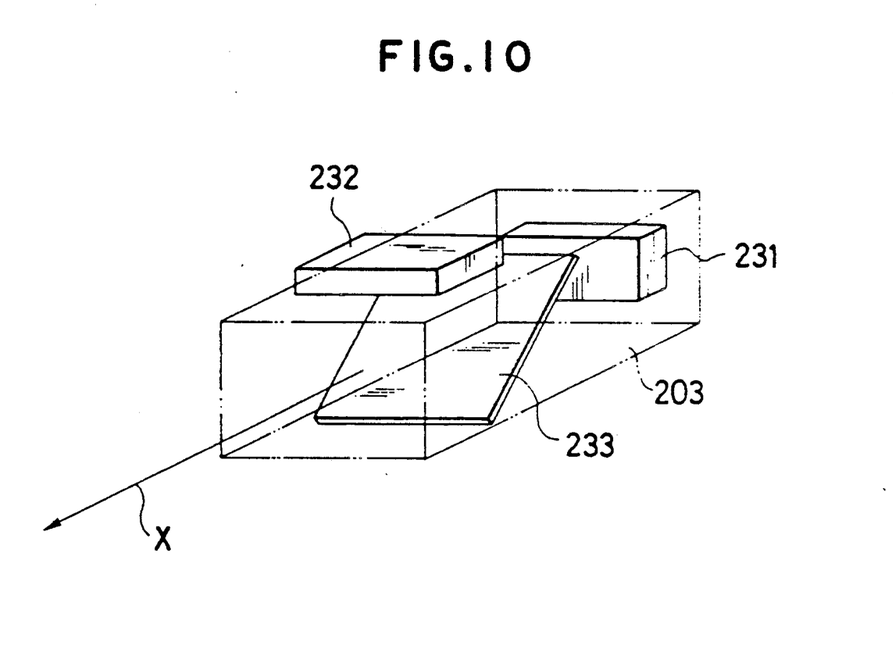
FIG. 10 is an enlarged perspective view of a projector disposed in the display apparatus of FIG. 9.

A projector 203 shown in FIG. 9 is disposed within a dash board 202, and has first and second display devices 231 and 232 as shown in FIG. 10. A display face of the first display device 231 is directed in the projecting direction X, and a display face of the second display device 232 is directed in a direction perpendicular to the projecting direction X. The projector 203 further has a half mirror 233 inclined by suitable angles with respect to the display faces of the first and second display devices 231 and 232.

Figure 11:
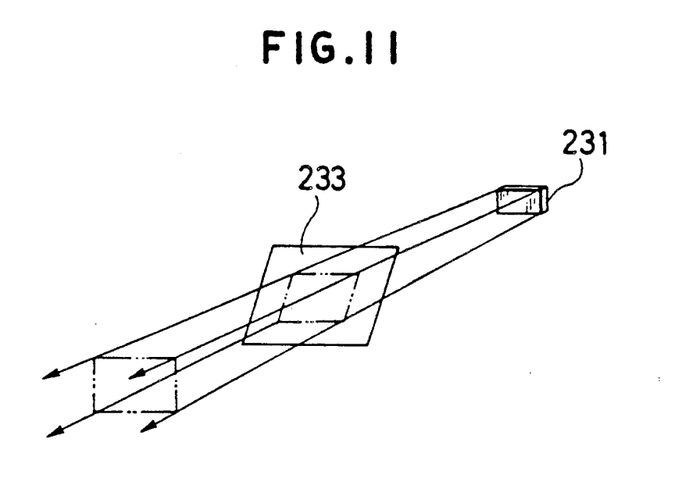
FIGS. 11 and 12 are views for explaining the relation between a half mirror and display devices of the projector of FIG. 10.
Figure 12:
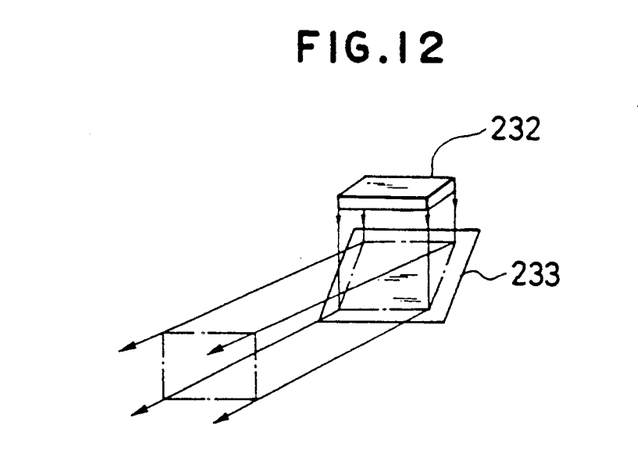
Figure 13:
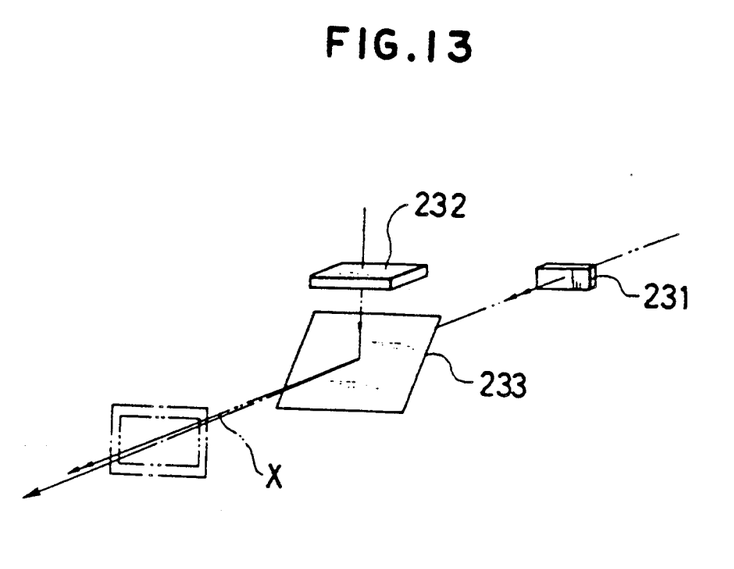
FIGS. 13 and 14 are views for explaining the synthesis of displayed images provided by the display devices of FIGS. 11 and 12.
Figure 14:
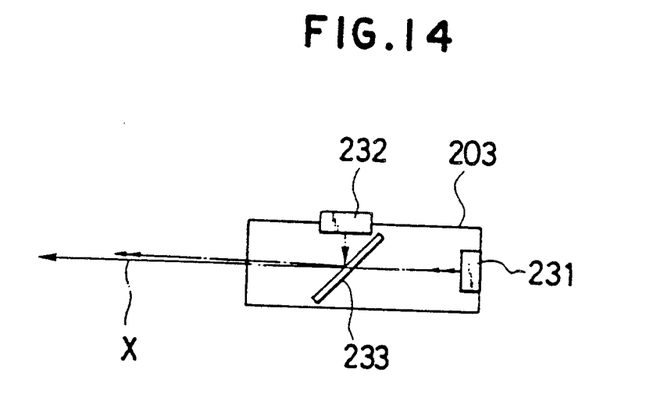

As shown in FIG. 11, a display pattern on the first display device 231 penetrates the half mirror 233, and a display pattern on the second display device 232 is reflected by the half mirror 233 as shown in FIG. 12, and both the display patterns on the first and second display devices 231 and 232 are respectively synthesized and projected in the same direction X, as shown in FIGS. 13 and 14. The inclination angle of the half mirror 233 with respect to the second display device 232 is carefully set to project the display patterns in the same direction X.

The display patterns on the first and second display devices 231 and 232 projected from the projector 203 are projected on the front glass 204 as a combiner as shown in FIG. 9, and are then reflected by the front glass 204 so that the reflected display patterns can be visualized by a driver 206. Thus, the driver 206 can visually look at virtual images 231a and 232a of the display patterns on the respective first and second display devices 231 and 232 in front of the front glass 204.

As shown in FIG. 9, the distance between the half mirror 233 and the front glass 204 is designated by a, and the distance between a display face on the first display device 231 and the half mirror 233 is designated by b, and the distance between a display face on the second display device 232 and the half mirror 233 is designated by c. When the distance b is greater than the distance c, the virtual images 231a and 232a can be formed in forward positions in which the distances from the front glass 204 to the virtual images 231a and 232a are respectively (a+b) and (a+c).

As mentioned above, the virtual images 231a and 232a are not displayed on the same plane, but are displayed in different positions in the same display region in the forward and backward directions, thereby providing a deep feeling for the display image and improving the visuality thereof.

The second display device 232 may be constituted to display various kinds of alarms, and colors of the first display device and the display may be different from each other, thereby increasing variation of the display content and color. In the above embodiments, the front glass 204 is used as a combiner, but a combiner composed of a half mirror, etc., may be independently disposed in front of the front glass 204.

As mentioned above, in accordance with the present invention, since two kinds of images in different display positions are formed in front of a front glass, the apparatus can provide a deep feeling for the displayed images, and improve the visuality of the displayed images and increase variation of the display and displayed content.

In particular, since an image penetrating a half mirror and an image reflected by the half mirror are overlapped and projected, the displayed area is not increased, and the display is effectively performed at a high density.

Figure 15:
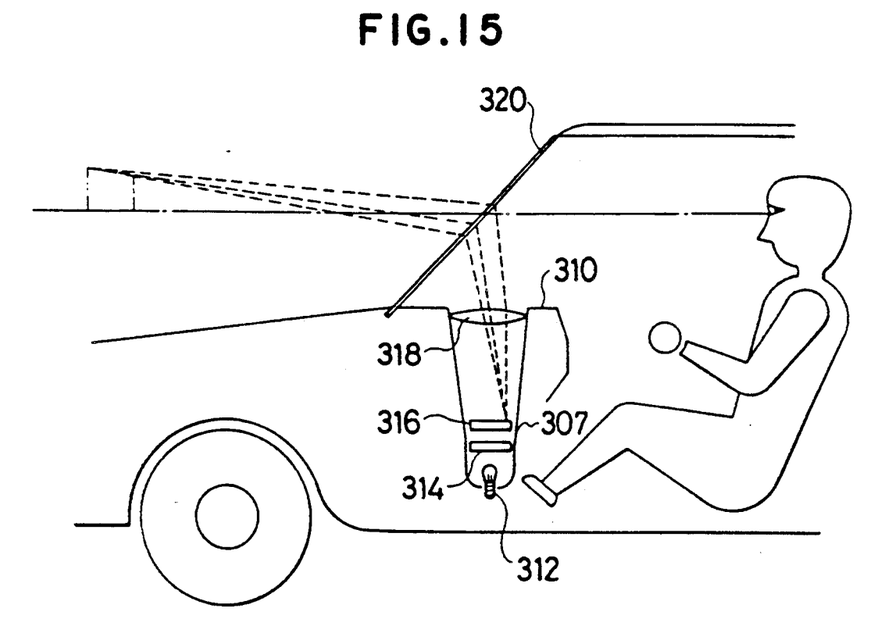
FIG. 15 is a schematic view showing the whole construction of a head-up display apparatus for a vehicle in another embodiment of the present invention.
Figure 16:
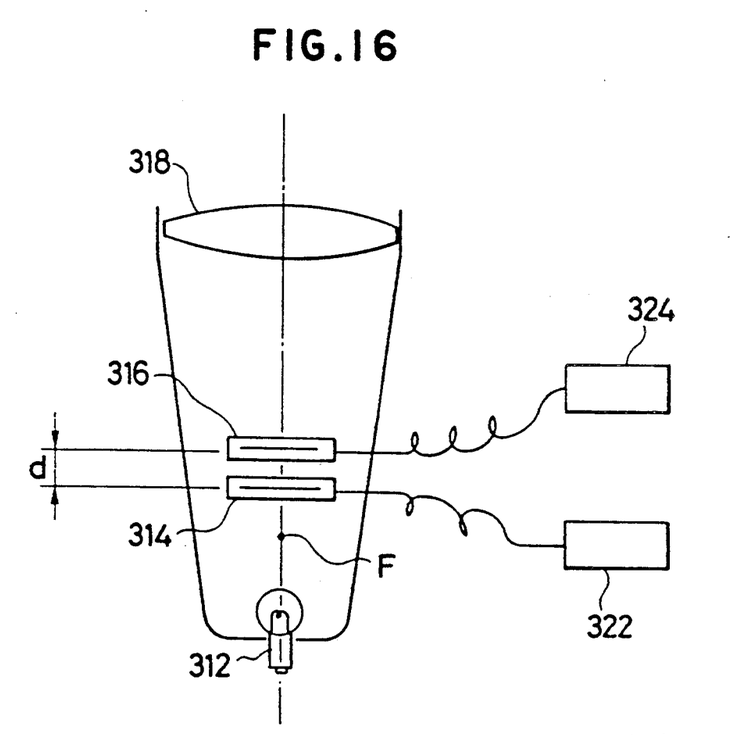
FIG. 16 is an enlarged view of a main portion of the head-up display apparatus of FIG. 15.

FIGS. 15 and 16 show a head-up display apparatus for a vehicle to which a virtual image display apparatus in accordance with one embodiment of the present invention is applied.

In FIGS. 15 and 16, a vehicle has an instrument panel 310, a light source 312 disposed within the instrument panel 310, double liquid crystal cells 314 and 316 disposed within the instrument panel 310 and within an optical path on the upper side of the light source 312, and a lens 318 fitted and fixed to an upper opening of the instrument panel 310 and enlarging an image formed through the liquid crystal cells 314 and 316.

Light from the lens 318 is projected onto a front shield glass 320 disposed in front of the instrument panel 310 and also used as a half mirror, and the image reflected by the front shield glass 320 is formed as a virtual image in front of the shield glass 320.

The respective liquid crystal cells 314 and 316 are arranged within focal distance f of the lens 318 with a predetermined clearance d therebetween, and display respective images having display patterns in accordance with outputs of drive circuits 322 and 324 operated in association with respective meters.

In the structure mentioned above, the light of the light source 312 penetrates the respective liquid crystal cells 314 and 316, and the images of the display patterns formed within the liquid crystal cells are projected onto the shield glass 320 through the lens 318. The images reflected by the shield glass 320 are formed as virtual images in front of the shield glass 320.

A driver can look at the displayed virtual images reflected by the shield glass on the front side of the vehicle.

At this time, since the display patterns of the respective liquid crystal cells 314 and 316 are separated from each other by clearance d, and are respectively formed as virtual images in different positions after the penetration of the lens 318.

Accordingly, the driver visually overlaps the respective virtual images with each other, thereby providing a stereo-image.

Figure 17:
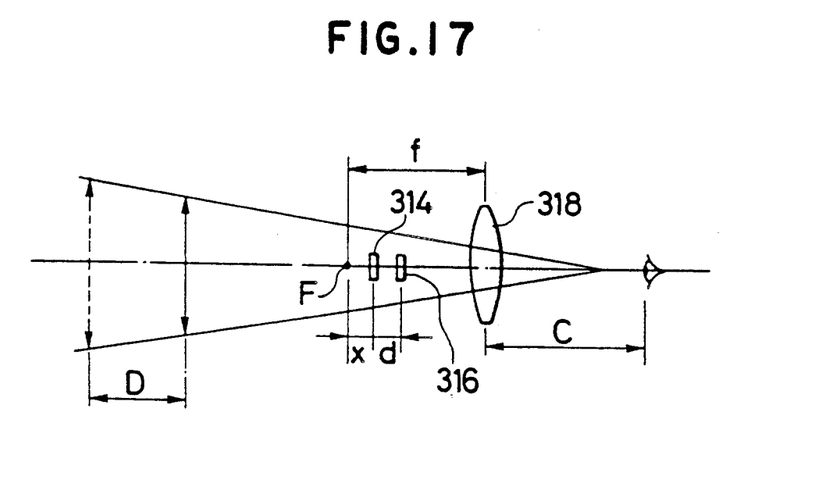
FIG. 17 is a schematic view showing the geometrical construction of a stereo-image.

As schematically shown in FIG. 17, to calculate distance D between the virtually formed images, distance L of the virtual image from a driver's eye is represented by the following equation where the focal distance f is 200 mm, the distance X between the liquid crystal cell 314 and the focal point F is 2 mm, and clearance d is 2 mm, for example.

$$L = (f^2 - fX)/X + C$$

where C designates the distance between the lens 318 and the driver's eye and is assumed to be constant.

Accordingly, $$X_1 = 2 \text{ mm},$$

$$X_2 = X_1 + d = 4 \text{ mm}.$$

When each of these distances $X_1$ and $X_2$ is substituted as distance X into the above equation to calculate each distance L, the distance D between the virtually formed images is 10 m, so that the driver can visually overlap both virtual images with the clearance therebetween being 10 m.

The difference 10 m in position looks large, but, when the driver visually overlaps the virtual images, the driver has no feeling of such a long distance, and such a distance is a suitable value for providing a deep distance between the virtual images.

Figure 18:
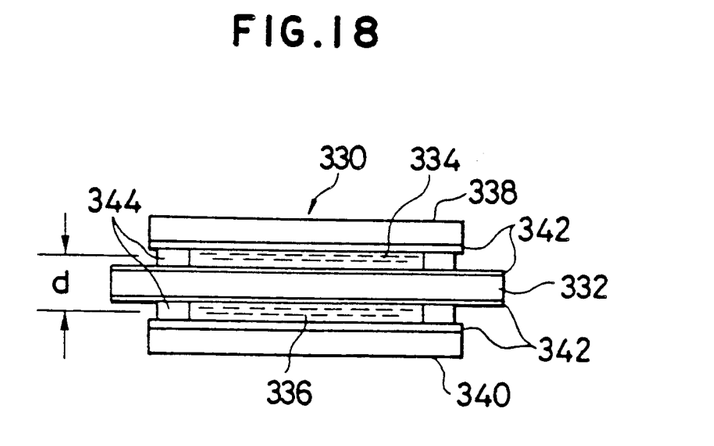
FIG. 18 is a cross-sectional view showing the integration of double liquid cells.

FIG. 18 shows an example in which the respective liquid crystal cells are integrally formed. An integral liquid crystal cell structure 330 has a central transparent glass plate 332, and display media 334 and 336 such as liquid crystal display (LCD) disposed on the upper and lower sides with respect to the central transparent glass plate 332 and forming doubly stacked layers.

Transparent glass plates 338 and 340 respectively cover the upper and lower faces of the respective liquid crystal display media 334 and 336. Transparent electrodes 342 are arranged between the respective glass plates 332, 338, 340 and the liquid crystal display media 334, 336. Spacers are disposed between the respective glass plates 338 and 340.

Such a structure mentioned above provides a stereo-image overlapped by a predetermined distance D when the thickness of the central transparent glass plate 332 is distance d.

In the embodiments mentioned above, the display apparatus provides a double image, but when more than three liquid crystal cells are integrally formed, it provides a stereo-image having more than three multiplicity without giving any influence on the light transmission.

Further, in the embodiments mentioned above, the liquid cell is used as a display device, but a display device of a light transmission type such as a transparent electroluminecence panel may be used.

As mentioned above, in accordance with the present invention, images of display patterns of liquid crystal cells suitably spaced apart from each other pass through a lens and are formed and displayed as virtual images in different positions. Accordingly, a driver can visually overlap the images virtually formed in different positions, thereby providing a stereo-image. Further, when the display patterns of the respective liquid crystal cells are individually changed while regularly holding the whole patterns, the driver can look at the stereo-image having different display patterns in the overlapping state thereof, thereby securing the number of dots provided by the respective overlapped liquid crystal cells. Accordingly, the quality of the image is improved, and the driver can look at a strengthened stereo-image in comparison with the conventional apparatus in which a single display pattern is formed on a plane.

What is claimed is:

1. A display apparatus for a motor vehicle, comprising:
    a projecting face provided in front of a driver's seat of the motor vehicle; and
    projecting means including at least first and second display devices each having a display pattern therein, the first and second display devices being adapted to, in use, directly project the display patterns from the same direction onto the projecting face to form virtual images of the display patterns in such a manner that the virtual images overlap on an outer landscape in front of the projecting face, wherein the first and second display devices of the projecting means are arranged within the projecting means in front-to-back relationship with each other in order to produce the virtual images of the display patterns in positions different from each other in front of the projecting face, thereby providing a stereo-image indication of the projected display patterns.

2. The display apparatus as claimed in claim 1, wherein the projecting means further comprises a lens for enlarging the projected display pattern from the first or second display device.

3. The display apparatus as claimed in claim 1, wherein the second display device is arranged far away from the first display device with respect to the projecting face.

4. The display apparatus as claimed in claim 3, wherein the first display device comprises two spaced devices each having the display pattern, and the second display device is disposed at the back of the portion between the two spaced devices.

5. The display apparatus as claimed in claim 4, wherein the projecting means further comprises a lens for enlarging the display pattern projected from the second display device, the lens being disposed between the spaced devices of the first display device.

6. The display apparatus as claimed in claim 4, wherein the projecting means is provided as a unit disposed within a dashboard of the motor vehicle.

7. The display apparatus as claimed in claim 5, wherein the projecting means is provided as a unit disposed within a dashboard of the motor vehicle.

* * * * *